Aug. 7, 1956
C. F. MATTHES
2,758,035
BLEED-PROOF DECALCOMANIA AND METHOD OF MAKING THE SAME
Filed Dec. 16, 1953
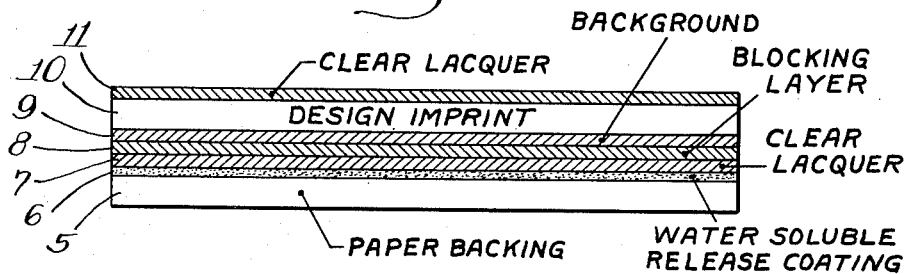
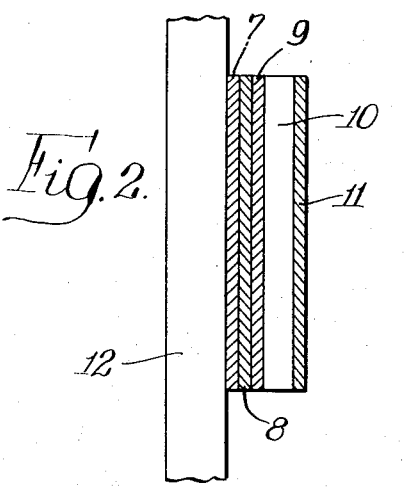
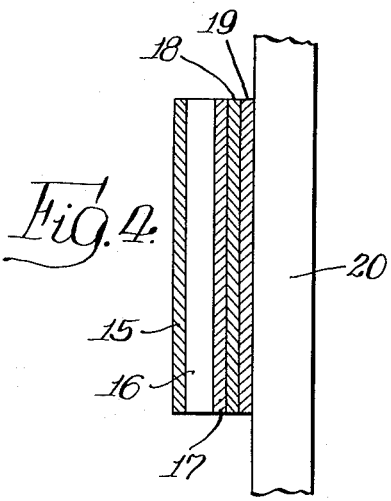
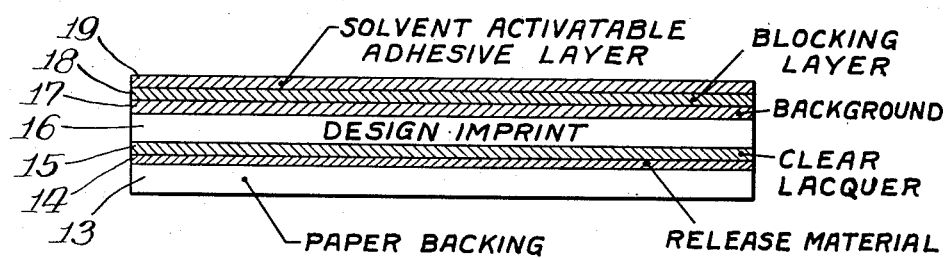
INVENTOR.
Carl F. Matthes,
BY
Davis, Lindsey, Hibben & Noyes Atty's.

2,758,035

BLEED-PROOF DECALCOMANIA AND METHOD OF MAKING THE SAME

Carl F. Matthes, Wheaton, Ill., assignor to The Meyercord Co., Chicago, Ill., a corporation of Illinois Application December 16, 1953, Serial No. 398,581

19 Claims. (Cl. 117—3.6)

This invention relates to improvements in decalcomanias and particularly to decalcomanias for use in the decoration of surfaces having pigmented finishes.

It is well known in the decalcomania art that when a decalcomania design is applied to a surface having a pigmented finish difficulty is frequently encountered with bleeding or migration of color from the pigmented finish into the applied design. The resultant disfiguration of the design is obviously undesirable. Certain pigments or colors in such finishes are more susceptible to bleeding or migration than others. For example, the bleeding effect is most noticeable when a decalcomania design having a white background layer is applied over a red finish containing a bleeding pigment or color. Under such circumstances, the white background layer of the applied design gradually acquires an undesirable pink cast or discoloration.

The most notorious bleeders in the pigment field are the dyes or colors of the para family and its derivatives, including para reds, para nitraniline red and orange, and the PTA blues and greens. The pigments and colors of the toluidine family including the toluidine reds and Hansa yellows also cause frequent bleeding problems. To a lesser degree, the naphthol reds and rubine reds also introduce difficulties.

In the case of a decalcomania of the solvent application type, the bleeding problem is often accentuated. A decalcomania of this type has a normally non-tacky adhesive layer at its outer surface which is activated or rendered tacky by application of a suitable solvent, the activated or tacky adhesive surface of the decal thereafter being applied to the article being decorated. If the finish on the surface being decorated contains a bleeding pigment, the pigment is usually more soluble in the solvent used during application of the decal than it would be in water. Consequently, there is a greater tendency for migration of a bleeding color from a finish of this character than would be the case when a water releasable decalcomania is employed. In addition, the solvent may also have a detrimental action on the vehicle holding the pigment in the finish with the result that the pigment or color is released more readily from the finish than would otherwise be the case.

Attempts have been made to overcome the bleeding problem by utilizing in the decalcomania a film of metallic leaf in order to block migration of color from the finished surface to the applied transfer design. Other types of blocking materials have also been tried. However, prior to my invention the blocking materials which were found to be effective in resisting penetration of a bleeding pigment in the design layer also resulted in a serious reduction in the outdoor life and durability of the decalcomania. This interference with proper outdoor life or durability of the decalcomania is believed to be due to the inability of the previously known blocking materials to expand and contract with the other films comprising the decalcomania. As a result, the transfer design of the decalcomania tends to blister and break up or otherwise become disrupted in an undesirably short period of time after exposure to outdoor weather and temperature conditions. Moreover, the previously known blocking materials have been so different in composition from the lacquers used in forming the remaining portions of the decalcomania that the blocking film has little affinity for the other layers of the decalcomania and is prone to undergo delamination. Obviously, therefore, the techniques heretofore proposed for overcoming the difficulty of bleeding colors in pigmented finishes have not been satisfactory because they have introduced other equally serious problems and defects.

Accordingly, a primary object of my invention is to provide novel means for preventing bleeding or migration of color from a pigmented surface to a decalcomania design applied over the surface.

Another object of the invention is to provide a novel decalcomania structure having special provision for protecting the design portion thereof from disfiguration by bleeding colors after application of the design to a pigmented surface.

A further object of the invention is to provide a novel decalcomania including a bleed-proof blocking layer comprising a novel combination of ingredients.

Still another object of the invention is to provide a novel decalcomania having means for resisting disfiguration of the decalcomania design by migratable or bleeding colors without detracting from the outdoor life of the decalcomania or its resistance to delamination.

An additional object of the invention is to provide a novel method of forming a bleed-proof decalcomania.

Other objects and advantages of the invention will become apparent from the subsequent detailed description, particular reference being made to the accompanying drawing, wherein:

Fig. 1 is a cross-sectional view on an exaggerated scale of a decalcomania comprising one specific embodiment of the present invention;

Fig. 2 is a sectional view showing the design portion of the decalcomania illustrated in Fig. 1 after application thereof to a pigmented surface;

Fig. 3 is a view similar to Fig. 1 but showing a different embodiment of the invention; and Fig. 4 is a view similar to Fig. 2 but showing the design portion of the decalcomania illustrated in Fig. 3 after application thereof to a pigmented surface.

Referring to Figs. 1 and 2 of the drawing, the invention is first illustrated in connection with a so-called slide-off or water releasable decalcomania in which the transfer design is carried on a paper backing having a water soluble coating such as dextrine or other water soluble gum. Upon application of water to the backing, the water soluble coating is softened so that the transfer design is released. A sufficient amount of the gum coating adheres to the released design to function as a bonding or adhesive agent for adhering the design to a surface being decorated.

In Fig. 1, the paper backing is indicated at 5 and the water soluble coating at 6. A clear lacquer layer 7 is disposed directly over the gum coating 6 and serves as a support or foundation for the subsequent layers. This lacquer layer may conveniently comprise a dried lacquer residue from an original lacquer composition containing nitrocellulose, a suitable solvent such as Cellosolve (2-ethoxy ethanol) and a plasticizer such as castor oil. Other cellulose ethers and esters may be employed in the lacquer, e. g. ethylcellulose or cellulose acetate. A bleed-proof blocking layer or film 8 is applied over the clear lacquer layer 7, this blocking layer 8 having a unique composition as hereinafter described in detail. Over the blocking layer 8 a transfer design is imprinted by any suitable means, and this design usually comprises a compound or multicomponent layer containing a plurality of different colors. In the present illustration, the first layer is indicated at 9 and comprises a background for the design such as a white pigmented lacquer. A typical formulation for the lacquer used in forming such a white background layer may be as follows:

| | Weight percent |
|---|---|
| Nitrocellulose | 12.8 |
| Titanium dioxide | 34.2 |
| Soybean oil | 6.8 |
| Dibutyl phthalate | 6.8 |
| Castor oil | 6.8 |
| Butyl Cellosolve (2-ethoxy ethanol) | 17.1 |
| Butyl alcohol | 6.8 |
| Butyl acetate | 8.7 |
| | 100.0 |

However, it will be understood that other suitable formulations well known in the decalcomania art may be used to form the background layer. Over the background layer 9, a plurality of color prints indicated at 10 are laid down to form the desired multi-color design imprint. Finally, an outermost clear lacquer layer 11 is applied for protective purposes. The clear lacquer layer 11 may be similar in composition to the layer 7. The composite layer 10 is formed from colored decalcomania inks of the usual type well known in the art. In most instances, these decalcomania inks comprise pigmented lacquers of the nitrocellulose type.

In forming the blocking layer 8, which is the principal feature of my invention, I utilize a special combination of ingredients for the purpose of imparting the desired combination of properties to the blocking layer. One of the principal ingredients of this film is animal glue which may be any of the well known types made from bone or hide or the like. For example, the product manufactured by Armour & Company and designated as AA Hide Glue is highly satisfactory. The other important ingredient of the film 8 is a resinous film-forming material which is compatible with the glue. The preferred resinous material for purposes of my invention is polyvinyl acetate. The animal glue contained in the film 8 functions as the blocking agent for preventing migration or bleeding of color from the pigmented surface being decorated. The polyvinyl acetate or other compatible resinous film-forming material provides the body of the blocking film and imparts the highly desirable properties of flexibility and expansibility. The polyvinyl acetate component of the blocking film also has the necessary affinity for and compatibility with the other lacquer films constituting the remaining layers of the decalcomania so that there is no tendency toward delamination.

As is well known in the decalcomania art, the various lacquers and formulations used in forming the respective layers of the decalcomania may be applied to the backing by spraying, brushing, roller coating, silk screen printing, lithographic printing, or other means. Each layer is, of course, allowed to dry before succeeding layers are applied. Consequently, the blocking layer 8 must also be capable of application in the same general manner. The animal glue is soluble in water and it is, therefore, necessary that the resinous film-forming ingredient of the film 8 be water miscible or water dispersible so that the two principal ingredients can be formulated in single liquid medium. I have obtained excellent results with a polyvinyl acetate emulsion containing, for example, 55% by weight of polyvinyl acetate solids. Suitable polyvinyl acetate emulsions are the TS-35 formulation manufactured by Shawinigan Products Corporation and the 10K11 product manufactured by National Adhesives Company.

Preferably, the animal glue is first dissolved in water and a suitable water miscible plasticizer for the glue and a water miscible solvent are added. Any of the well known water miscible plasticizers for glue such as the sulfonated vegetable oils, e. g. Turkey red oil, or glycerine or mixtures thereof may be used. As examples of suitable water miscible solvents, I may use ethyl lactate, diacetone alcohol, or any of the water miscible glycol ethers. The water solution of glue, plasticizer, and solvent is then combined with the desired proportion of polyvinyl acetate emulsion and thoroughly mixed. The resultant formulation is quite stable and lends itself readily to any of the aforementioned methods of application during the manufacture of the decalcomanias.

Inasmuch as the polyvinyl acetate component of the dry blocking film provides the body of this film, I prefer that the polyvinyl acetate be present in the dry film in at least equal proportion with the glue and usually in major proportion. By way of example, the following formulation gives good results when employed in forming the blocking film (parts by weight):

| | |
|---|---|
| Animal glue | 7.2 |
| Plasticizer | 2.7 |
| Solvent | 8.2 |
| Water | 65.6 |
| Polyvinyl acetate emulsion (55%) | 16.3 |
| | 100.0 |

When the above formulation or formulation similar thereto is employed to form the blocking layer 8 in the decalcomania of Fig. 1, an excellent bleed-proof decalcomania is provided. The film 8 because of its glue content completely prevents migration of color into the design film of the applied decalcomania and it is substantially colorless so that it does not interfere with the desired design characteristics of the decalcomania. Moreover, this film has excellent compatibility and affinity for the other lacquer layers in the decalcomania with the result that it does not tend to delaminate from either of the films 7 or 9 adjacent thereto and furthermore has excellent outdoor durability. In other words, the presence of polyvinyl acetate in the glue-containing blocking film 8 permits the blocking film to expand and contract together with the remaining components of the decalcomania so that there is no tendency toward film break up and disruption upon exposure to outside weather conditions and changes in temperature.

In Fig. 2, I have illustrated the manner in which the blocking layer 8 protects the design film of the decalcomania after application to a pigmented surface. Thus, after moistening of the paper backing and resultant softening of the water soluble layer 6, the remaining layers 7, 8, 9, 10 and 11 are released as a unit and the released unit is applied to a surface 12 having a pigmented finish. As hereinbefore explained, the small amount of water soluble gum which adheres to the layer 7 after release of the paper backing is sufficient to cause adherence of the layer 7 to the surface 12. Consequently, as seen in Fig. 2, the blocking layer 8 in the applied transfer design is interposed between the pigmented surface 12 and the background layer 9 of the design. In the event that the pigments or colors in the finish on the surface 12 are of the bleeding or migratable type, these colors cannot penetrate through the blocking layer 8. Thus, the white background layer 9 and the remaining layers of the transfer design are protected from discoloration.

In Fig. 3, I have illustrated another embodiment of the invention in which the blocking layer is incorporated in a decalcomania of the solvent applied type. In this case, the carrier comprises a paper backing 13 having a coating 14 of a suitable dry strip release material such as polyethylene. A clear lacquer layer 15, a composite design imprint 16, and a white background layer 17 are superimposed in the order named on the polyethylene coating 14. Over the background layer 17 of the transfer design, I apply a blocking film 18 of the same character described above in connection with the layer 8 in Fig. 1. Finally, the outermost layer of the decalcomania, indicated at 19, consists of a solvent activatable adhesive material.

In its dry state, this layer is a non-tacky non-pressure sensitive layer but is capable of being activated by means of a suitable organic solvent in order to develop adhesive properties therein. Many such combinations of solvents and activatable adhesives are well known in this art. Merely by way of example, a typical composition for the layer 19 may contain equal parts by weight of nitrocellulose, a rosin-modified maleic type resin such as Amberol 801 manufactured by Rohm & Haas, and blown castor oil. For activating the above adhesive material, an organic solvent such as toluol or other aromatic hydrocarbon, mineral thinner, ethyl acetate, or mixtures thereof may be used.

As will be evident, in Fig. 3 the blocking layer is disposed in a somewhat different predetermined order with respect to the design imprint and the releasable backing as compared with the water release decalcomania illustrated in Fig. 1. However, in each case the blocking film is so located that after the transfer design is applied to a surface being decorated, the blocking film will be interposed between the surface and the transfer design which requires protection from bleeding.

Thus, in Fig. 4 the decalcomania of Fig. 3 is shown after application thereof to a pigmented surface 20. In applying this type of decalcomania, the outermost adhesive layer 19 is first activated by applying the activating solvent either to the layer 19 or to the surface 20 or both. The activated adhesive surface 19 is then pressed into engagement with the surface 20 being decorated. Shortly thereafter, the releasable backing 13 can be dry stripped by reason of the release properties of the polyethylene or other dry release coating 14 having little affinity for the lacquer layer 15. As finally applied, it will be seen that the blocking layer 18 is interposed between the pigmented surface 20 and the white background layer 17 so as to prevent bleeding or migration of color from the surface 20 to the background layer.

Although the invention has been illustrated herein with particular reference to two specific types of decalcomanias, it will be understood that the principles of the invention involving the use of the novel blocking film herein described are applicable to any type of decalcomania wherein the problem of bleed-proofing is presented.

I claim:

1. A bleed-proof decalcomania comprising a transferable design layer, a layer of an adhesive material disposed over one side of said design layer for adhering the design layer to the surface being decorated, a blocking layer interposed between said design layer and said adhesive layer, and a releasable carrier having said layers supported thereon, said blocking layer comprising animal glue and a resinous film-forming material compatible with said glue.

2. The decalcomania of claim 1 further characterized in that said resinous film-forming material comprises polyvinyl acetate.

3. A bleed-proof decalcomania comprising a releasable carrier, a transferable design supported on said carrier and adapted to be adhered at one side thereof to a surface being decorated, and a blocking layer disposed over said one side of the design whereby upon transfer of the design said blocking layer is interposed between the design and the surface being decorated, said blocking layer comprising animal glue and polyvinyl acetate.

4. In a decalcomania having a carrier and a transfer design releasable from the carrier, the improvement which comprises a bleed-proof blocking layer disposed over the side of the design which is to be adhered to a surface being decorated, said blocking layer comprising animal glue and polyvinyl acetate and being adapted to prevent migration of pigment from the surface being decorated to the design whereby to avoid disfiguration of the latter.

5. A bleed-proof decalcomania comprising a transferable design including a background layer and at least one color print thereon, a layer of adhesive material disposed over said background layer for adhering the design to a surface being decorated with the background layer closest to the surface and the color print outermost, a blocking layer interposed between said background layer and said adhesive layer whereby upon transfer of the design said blocking layer is interposed between the background layer and the surface being decorated, and a releasable carrier having said layers supported thereon, said blocking layer comprising animal glue and a resinous film-forming material compatible with said glue.

6. A bleed-proof decalcomania comprising a releasable carrier, a transferable design supported on said carrier and including a background layer and at least one color print thereon, said design being adapted to be adhered to a surface being decorated with the background layer closest to the surface and the color print outermost, and a blocking layer disposed over said background layer whereby upon transfer of the design said blocking layer is interposed between the background layer and the surface being decorated, said blocking layer comprising animal glue and polyvinyl acetate.

7. A bleed-proof decalcomania comprising a carrier having a water soluble release coating thereon, a blocking layer disposed over the coated side of said carrier and comprising animal glue and a resinous film-forming material compatible with said glue, and a transfer design imprinted on said blocking layer, said design and said blocking layer being releasable as a unit from said carrier upon softening of said coating with water and being adapted to be adhered to a surface being decorated with said blocking layer innermost for preventing migration of pigment from the surface to the design.

8. A bleed-proof decalcomania comprising a carrier having a water soluble release coating thereon, a blocking layer disposed over the coated side of said carrier and comprising animal glue and polyvinyl acetate, and a transfer design imprinted on said blocking layer, said design and said blocking layer being releasable as a unit from said carrier upon softening of said coating with water and being adapted to be adhered to a surface being decorated with said blocking layer innermost for preventing migration of pigment from the surface to the design.

9. A bleed-proof decalcomania comprising a carrier having a water soluble release coating thereon, a clear lacquer layer directly over the coated side of said carrier, a blocking layer disposed over said clear lacquer layer and comprising animal glue and a resinous film-forming material compatible with said glue, and a transfer design imprinted on said blocking layer, said design and said clear lacquer and blocking layers being releasable as a unit from said carrier upon softening of said coating with water and being adapted to be adhered to a surface being decorated with said blocking layer innermost for preventing migration of pigment from the surface to the design.

10. The decalcomania of claim 9 further characterized in that said resinous film-forming material comprises polyvinyl acetate.

11. A bleed-proof decalcomania comprising a carrier having a dry release coating thereon, a transfer design disposed on the coated side of said carrier, a blocking layer disposed over said transfer design, and an activatable adhesive material covering said blocking layer, said blocking layer comprising an animal glue and a resinous film-forming material compatible with said glue.

12. A bleed-proof decalcomania comprising a carrier having a dry release coating thereon, a transfer design disposed on the coated side of said carrier, a blocking layer disposed over said transfer design, and an activatable adhesive material covering said blocking layer, said blocking layer comprising an animal glue and polyvinyl acetate.

13. A bleed-proof decalcomania comprising a carrier having a polyethylene surface thereon, a clear lacquer layer directly over the polyethylene surface of said carrier, a transfer design disposed on said clear lacquer layer, a blocking layer disposed over said transfer design and comprising animal glue and a resinous film-forming material compatible with said glue, and an outermost adhesive layer over said blocking layer and comprising a normally non-tacky adhesive material adapted to be activated by application of a solvent thereto for converting the same to a tacky state.

14. The decalcomania of claim 13 further characterized in that said resinous film-forming material comprises polyvinyl acetate.

15. A bleed-proof decalcomania comprising a releasable carrier, a transferable design supported on said carrier and adapted to be adhered on one side thereof to a surface being decorated, and a bleed-proof blocking layer disposed over said one side of the design, said blocking layer comprising a major proportion of polyvinyl acetate forming the body of the layer and having an affinity for the design so as to resist delamination therebetween and a lesser proportion of animal glue as a blocking agent for preventing migration of pigment from the surface being decorated to said design.

16. The decalcomania of claim 15 further characterized in that said blocking layer also includes a minor proportion of a water soluble plasticizer for said glue.

17. The method of making a bleed-proof decalcomania which comprises applying in predetermined sequence over one side of a backing a transferable design, an adhesive material for securing the design to a surface, and an aqueous composition comprising animal glue and an emulsion of water miscible resinous film-forming material compatible with said glue whereby to provide, upon drying of said composition, a blocking layer between said design and said adhesive material adapted to prevent migration of pigment from a surface being decorated to the design.

18. The method of making a bleed-proof decalcomania which comprises applying in predetermined sequence over one side of a releasable carrier a transfer design and an aqueous composition comprising animal glue and a polyvinyl acetate emulsion, and drying said composition to provide a blocking layer containing said animal glue and polyvinyl acetate for preventing migration of pigment from a surface being decorated to the design.

19. The method of claim 18 further characterized in that said composition also contains a water miscible plasticizer for the glue and a water miscible organic solvent.

References Cited in the file of this patent
UNITED STATES PATENTS

| | | |
|---|---|---|
| 1,780,021 | Laws | Oct. 28, 1930 |
| 1,968,394 | Hepp | July 31, 1934 |
| 2,143,868 | Dexheimer | Jan. 17, 1939 |
| 2,184,077 | Hart | Dec. 19, 1939 |
| 2,273,694 | Davis et al. | Feb. 17, 1942 |
| 2,359,185 | Wysong | Sept. 26, 1944 |
| 2,498,792 | Cottet et al. | Feb. 28, 1950 |
| 2,561,976 | Davis | July 24, 1951 |
| 2,677,672 | Luce | May 4, 1954 |